US006868276B2

(12) United States Patent
Nissilä

(10) Patent No.: US 6,868,276 B2
(45) Date of Patent: Mar. 15, 2005

(54) METHOD AND APPARATUS FOR ESTIMATING CARRIER FREQUENCY OFFSET AND FADING RATE USING AUTOREGRESSIVE CHANNEL MODELING

(75) Inventor: Mauri Nissilä, Oulu (FI)

(73) Assignee: Nokia Corporation, Espoo (FI)

( * ) Notice: Subject to any disclaimer, the term of this patent is extended or adjusted under 35 U.S.C. 154(b) by 93 days.

(21) Appl. No.: 10/464,061

(22) Filed: Jun. 17, 2003

(65) Prior Publication Data

US 2004/0259514 A1 Dec. 23, 2004

(51) Int. Cl.$^7$ ............................................... H04B 15/00
(52) U.S. Cl. ...................... 455/504; 455/506; 375/285; 375/349
(58) Field of Search ........................ 455/9, 63.1, 67.13, 455/226.1, 295, 296, 501, 504, 506; 375/285, 340, 341, 346, 349

(56) References Cited

U.S. PATENT DOCUMENTS

| | | | | |
|---|---|---|---|---|
| 5,048,054 A | * | 9/1991 | Eyuboglu et al. | 375/224 |
| 5,432,821 A | * | 7/1995 | Polydoros et al. | 375/340 |
| 5,748,677 A | * | 5/1998 | Kumar | 375/285 |
| 6,320,919 B1 | * | 11/2001 | Khayrallah et al. | 375/341 |

OTHER PUBLICATIONS

R. Shumway et al., "*An Approach to Time Series Smoothing and Forecasting Using the EM Algorithm*," Journal of Time Series Analysis, vol. 3, No. 4, 1982, pp. 253–264.

F. Gini et al., "*Cramér–Rao Bounds in the Parametric Estimation of Fading Radiotransmission Channels*," IEEE Transactioris on Communications, vol. 46, No. 10, Oct. 1998, pp. 1390–1398.

W. Kuo et al., "*Frequency Offset Compensation of Pilot Symbol Assisted Modulation in Frequency Flat Fading*," IEEE Transactions on Communications, vol. 45, No. 11, Nov. 1997, pp. 1412–1416.

Y. Zhang et al., "*Soft Output Demodulation on Frequency–Selective Rayleigh Fading Channels Using AR Channel Models*," Proc. of GLOBECOM '97, (Phoenix, AZ, USA), Nov. 1997, pp. 327–330.

H. Zamiri–Jafarian et al., "*Adaptive MLSDE Using the EM Algorithm*," IEEE Transactions on Communications, vol. 47, No. 8, Aug. 1999, pp. 1181–1193.

M. Morelli et al., "*Further Results in Carrier Frequency Estimation for Transmissions Over Flat Fading Channels*," IEEE Communications Letters, vol. 2, No. 12, Dec. 1998, pp. 327–330.

(List continued on next page.)

*Primary Examiner*—Quochien B. Vuong
(74) *Attorney, Agent, or Firm*—Ware, Fressola, Van der Sluys & Adolphson LLP

(57) ABSTRACT

A method for use by a receiver of a wireless communication system in providing information of use in adapting to changing characteristics of a communication channel (22) over which the receiver (23) receives a signal at an offset from a carrier frequency due to changes in the characteristics of the communication channel characteristics, the changing communication channel characteristics also causing from time to time changes in other characteristics of the communication channel (22), the method characterized by: a step (**23*b*-1*a* 23*b*-1*b*) of providing expectation maximization estimates of autoregressive parameters representing the changing communication channel (22) using received signal samples extracted from the received signal and corresponding to transmitted pilot symbol; and a step (23*b*-1*a* 23*b*-1*c***) of providing an estimate of the channel impulse response and an estimate of a frequency offset of at least one multipath signal based on the estimated values of the autoregressive parameters.

13 Claims, 4 Drawing Sheets

OTHER PUBLICATIONS

E. Jeong et al., "*Data–Aided Frequency Estimation for PSK Signaling in Frequency–Selective Fading,*" IEEE Journal on Selected Areas in Communications, vol. 19, No. 7, Jul. 2001, pp. 1408–1419.

D. Snyder et al., "*The Use of Maximum Likelihood Estimation for Forming Images of Diffuse Radar Targets from Delay–Doppler Data,*" IEEE Transactions on Information Theory, vol. 35, No. 3, May 1989, pp. 536–548.

C. Carlemalm et al., "*Schemes for Detection of Double Talk and Abrupt Changes in the Echo Path in Fading Communication Channels,*" Proc. of IEEE Intern. Symp. Inform. Theory, p. 26, Aug. 1998, p. 26.

L. Davis et al., "*Coupled Estimators for Equalization of Fast–Fading Mobile Channels,*" IEEE Transactions on Communcations, vol. 46, No. 10, Oct. 1998, pp. 1262–1265.

H. Viswanathan et al., "*A Frequency Offset Estimation Technique for Frequency–Selective Fading Channels,*" IEEE Communcations Letters, vol. 5, No. 4, Apr. 2001, pp. 166–168.

C. Carlemalm et al., "*Blind Channel Estimation for Fading Channels With Markov Inputs,*" Proc. of 9th IEEE Sig. Processing Workshop on Statist. Sig. and Array Processing SSAP '98 , 1998, pp. 292–295.

D. Mihai Ionescu et al., "*Predictive Closed–Loop Power Control for Frequency–Division Duplex Wireless Systems,*" IEEE Communications Letters, vol. 5, No. 6, Jun. 2001, pp. 248–250.

M. Nissilä et al., "*Adaptive Bayesian and EM–Based Detectors for Frequency–Selective Fading Channels,*" IEEE Transactions on Communications, vol. 51, No. 8, Aug. 2003, pp. 1325–1336.

* cited by examiner

METHOD AND APPARATUS FOR ESTIMATING CARRIER FREQUENCY OFFSET AND FADING RATE USING AUTOREGRESSIVE CHANNEL MODELING

FIELD OF THE INVENTION

The invention relates to the general area of advanced algorithms for radio receivers used in wireless communications, and more particularly to such algorithms for use in high bit-rate high mobility communication systems.

BACKGROUND OF THE INVENTION

An important feature of state-of-the-art and newly emerging communication systems (e.g. enhanced so-called third generation and later generation wireless telecommunication systems according to the third generation partnership program for the universal mobile telecommunication system) is a capability of both wireless transmitters and receivers to adapt their functionality and parameters according to prevailing channel conditions. Channel conditions in mobile communications change for example because as a mobile station changes location and as objects that scatter a mobile signal move about, the communication signal between the mobile station and the base station is differently reflected, refracted, and diffracted, giving rise to different multiple indirect paths linking the mobile and the base station with which the mobile is in communication. Thus, a signal transmitted by a transmitter at either a base station or a mobile terminal undergoes distortion (change in amplitude and phase) due to changing destructive interference among changing multiple propagation paths to a receiver, in what is known as (time-varying) multipath fading. As opposed to line of sight communication systems, mobile channels tend to have a large number of indirect paths, and to have different indirect paths at different times. In addition to fading, a signal will also experience dispersion, defined as spreading of the signal in time or frequency. Thus, mobile channels are typically fading dispersive communication channels.

In characterizing a fading dispersive channel so as to allow both transmitter and receiver to adapt to changing channel conditions, it is typically assumed that the response of the channel to a unit impulse is quasi-stationary, i.e. although the fluctuations in the channel are due to non-stationary statistical phenomena, on a short enough time scale and for small enough bandwidth, the fluctuations in time and frequency can be characterized as approximately stationary. For characterizing a mobile channel over short time periods, such as in determining short term fading, it is usually assumed that the channel impulse response is stationary in time, or in other words, that the channel is wide-sense stationary (WSS). In addition, it is often assumed that the channel impulse response is independent for different values of delay, in which case the channel is said to exhibit uncorrelated scattering of the transmitted signal. When a time-varying impulse response is assumed to have stationary fluctuations in time and frequency, the channel is said to be wide-sense stationary with uncorrelated scattering (WSSUS). A (statistical) model of a WSSUS channel requires only two sets of parameters to characterize fading and multipath effects: a power delay profile (PDP) parameter set and a Doppler power spectra (DPS) parameter set.

A WSSUS channel (in which, e.g. fading multipath occurs) can be characterized by a so-called scattering function $S(\tau,f)$, where $\tau$ denotes delay of an indirect path compared to the direct (mobile channel) path, and where $f$ denotes the frequency. The scattering function $S(\tau,f)$ is the double Fourier transform of the so-called spaced-frequency, spaced-time (auto) correlation function $r_{HH}(\Delta f, \Delta t)$ of the Fourier transform of the channel impulse response, i.e.

$$S(\tau, f) = \int_{-\infty}^{\infty}\int_{-\infty}^{\infty} r_{HH}(\Delta f, \Delta t) e^{j2\pi \cdot \Delta f \cdot \tau} e^{-j2\pi \cdot f \cdot \Delta t} d(\Delta f) d(\Delta t),$$

where $$r_{HH}(\Delta f, \Delta t) = \frac{1}{2} E\{H*(f, t) \cdot H(f + \Delta f, t + \Delta t)\},$$

where $E\{\ldots\}$ is the mathematical expectation of the indicated argument, and in which $H(f,t)$ is the Fourier transform of the channel impulse response function. The PDP and DPS parameter sets are defined by integration of the scattering function, as follows:

$$PDP(\tau) = \int_{-F_{D_{max}}}^{+F_{D_{max}}} S(\tau, f) df, \text{ and}$$

$$DPS(f) = \int_{0}^{\tau_{max}} S(\tau, f) d\tau.$$

The scattering function has the dimensions of power density. An example of a scattering function for a time varying channel is shown in FIG. 1.

Thus, because the scattering function includes information about how a communication channel varies in time and how it depends on the frequency of the transmitted signal, it includes information on (sufficient to determine) what is here called the (carrier frequency) offset $\Omega$ (also sometimes called the Doppler shift), i.e. the positive or negative change in carrier frequency of the transmitted signal due to dispersion (caused e.g. by Doppler scattering of the communication channel by moving objects in the communication channel) and the transmitter and receiver oscillator instabilities, and it also includes information on what is called the fading rate $v$—the product of the time interval T between when successive symbols are received and the bandwidth of the Doppler spectrum (called also a Doppler spread) $f_D$ (so that $v = f_D T$). The offset as used here is the total difference between the carrier frequency of the transmitted signal or a related frequency and a local frequency at which a (local) oscillator in the receiver oscillates—an oscillator originally tuned to (either) the carrier frequency (or an appropriate related frequency), i.e. initially tuned to a frequency suitable for receiving the carrier frequency. The frequency of the local oscillator can differ from the carrier frequency (or a related frequency) by the offset as the communication channel changes and/or the local oscillator in the transmitter or in the receiver exhibits a frequency drift. The frequency offset effectively causes a shift in the center frequency of the Doppler spectrum. The fading rate $v = f_D T$ (sometimes called a normalized Doppler spread) denotes what can be considered a bandwidth (normalized by T) of the received signal when a single tone is transmitted, i.e., a bandwidth of the Doppler spectrum (with T the time interval between successive symbols, as defined above). The Doppler spread $f_D$ is normalized with 1/T (bandwidth of the data signal) so that the quantity $v = f_D T$ measures the relation between the bandwidths of the data signal and the Doppler spread caused by the channel.

Note that the local oscillator is only tuned to the carrier frequency (as opposed to a related frequency) in direct conversion receivers. As indicated above in respect to the offset, the invention is equally feasible for heterodyne receivers using intermediate frequencies (IF). In such receivers, the local oscillator is not tuned to the carrier frequency ($f_c$) but is instead tuned to a related frequency, one that differs from the carrier frequency by the IF (i.e. either $f_c$–IF or $f_c$+IF).

For sampled received signals, the multipath fading channel can be described with a discrete-time tapped-delay-line model, such as shown in FIG. 5, where fading process $f_{i,k}$ for each tap is described with the first-order autoregressive lowpass process but the extension to higher-order models is straightforward. The scattering function for the discrete-time channel model is sampled in delay, as shown in FIG. 6. The discrete-time channel model is characterized by a discrete number of signal paths where at each path the transmitted signal experience some delay and multiplicative distortion, i.e., at each signal path the delayed version of the transmitted signal is multiplied by a time-varying fading coefficient and by a rotator that is rotating at the speed of the Doppler (shift) frequency. Each time-varying fading coefficient $f_{i,k}$ can be modelled as a low-pass random process with a bandwidth $v_i$ (called here a fading rate). The fading rate and Doppler frequency (carrier frequency offset) can in general be different for different resolvable multipath signals (for each channel tap). (In fact, from the physical modeling point of view, each resolvable multipath signal itself is also composed of a large number of separate multipath signals that experience approximately same delay, i.e., the difference in the delay between these multipath signal components is less than the symbol period. Therefore, each resolvable multipath signal can be regarded as a cluster of many multipath signal components with about the same delay and which sum up either constructively or destructively at any time instant, thus creating what is called here a fading channel tap. The difference in delay between any pair of resolvable multipath signals (any pair of channel taps) is equal to T or greater.) Therefore, it is important that the fading rate and offset be estimated for each resolvable multipath component of the received signal (for each channel tap) separately.

A statistically equivalent discrete-time channel model is presented in FIG. 7. The first-order AR-coefficients are in this model defined as $a_i = a'_i \exp(j2\pi\Omega)$ (for i=1 ... L) (but the extension to higher-order models is again straightforward). Thus, the originally lowpass fading process $f_{i,k}$ with the bandwidth determined by $a'_i$ is effectively converted to the complex bandpass process having a center frequency $\Omega_i$ and the same bandwidth as the equivalent lowpass process. (In fact, the original lowpass fading process is only shifted in frequency by $\Omega_i$). The main advantage of this channel model over the model described in FIG. 5 is that the modified AR-coefficients (matrix A) now includes information about both the bandwidth of the fading process (fading rate) and the Doppler (shift) frequency (frequency offset) in each channel tap. Hence, the explicit values for the fading rate and frequency offset related to any particular channel tap can be extracted from the estimated AR-coefficients pertaining to that particular channel tap.

The fading rate and offset can be used by a receiver in adapting to changing channel conditions, and knowledge of the scattering function generally is advantageous to both a receiver and a transmitter in adapting to changing channel conditions. (A receiver would e.g. change an equalization filter, and a transmitter would e.g. change modulation and coding.)

In current communication systems, the adaptivity of the transmitter and receiver to varying communication channel conditions is limited. As far as is known to the inventor, there does not exist in the prior art any reliable and computationally feasible method for estimating fading rate in case of general multipath fading. For estimating carrier frequency offset, the prior art does teach some methods but the performance of the prior art frequency offset estimation methods in high bit-rate and high mobility applications is generally unknown, and the inventor knows of no prior art teaching of obtaining the offset from a statistical autoregressive model of a communication channel. In particular, the prior art does not teach how to estimate jointly the fading rate and frequency offsets for different multipath signal components in a computationally feasible way.

(In a linear autoregressive model of order R, a time series $y_n$ is modelled as a linear combination of R earlier values in the time series, with the addition of a correction term $x_n$:

$$y_n^{model} = x_n - \sum_{j=1}^{R} a_j y_{n-j}.$$

The autoregressive coefficients $a_j$ are fit by minimizing the mean-squared difference between the modelled time series $y_n^{model}$ and the observed time series $y_n$. The minimization process results in a system of linear equations for the coefficients $a_n$, known as Yule-Walker equations. [See Yule, G. U., *On a method of investigating periodicities in disturbed series with special reference to Wolfer's sunspot numbers*, Phil. Trans. Roy. Soc. Lond. A 226, 267–298; 1927.] Conceptually, the time series $y_n$ is considered to be the output of a discrete linear feedback circuit driven by a noise $x_n$, a circuit in which delay loops of lag j have feedback strength $a_j$.)

What is needed is a simple method (or algorithm) for obtaining estimated values for carrier frequency offset (i.e. offset between received carrier frequency and local frequency reference) and also for fading rate, both separately for all resolvable multipath signals, and, ideally, estimated values of parameters characterizing a communication channel generally (i.e. so as to determine a scattering function for the channel) so as to enable improving the radio link between transmitter and receiver by allowing, preferably, both the transmitter and receiver to adapt to changing channel conditions based on the estimated values.

SUMMARY OF THE INVENTION

Accordingly, in a first embodiment the present invention provides a method for use by a receiver of a wireless communication system in providing information for use in adapting to changing characteristics of a communication channel over which the receiver receives a signal at a carrier frequency, the receiver having a local oscillator oscillating at a local frequency initially tuned to a frequency suitable for receiving the carrier frequency, the method characterized by: a step, responsive to received signal samples extracted from the received signal and corresponding to transmitted symbols, of providing estimates of autoregressive parameters representing the changing communication channel based on a predetermined parametric model of how as a result of stochastic processes the communication channel changes over time; and a step, responsive to the estimated values of the autoregressive parameters, of providing an estimate of the channel impulse response and an estimate of a frequency offset of at least one multipath signal.

In accord with the first aspect of the invention, the estimates of autoregressive parameters may be expectation maximization estimates.

Also in accord with the first aspect of the invention, in the step of providing an estimate of the channel impulse response and an estimate of a frequency offset of at least one multipath signal, an estimate of power spectral density may also be provided.

Also in accord with the first aspect of the invention, in the step of providing an estimate of the channel impulse response and an estimate of a frequency offset of at least one multipath signal, an estimate of fading rate may also be provided.

Also in accord with the first aspect of the invention, in the step of providing an estimate of the channel impulse response and an estimate of a frequency offset of at least one multipath signal, the receiver may use the estimate of the channel impulse response to provide a value for at least either the offset or the fading rate for at least one multipath signal.

Also in accord with the first aspect of the invention, the predetermined parametric model may be an autoregressive model providing linear equations describing the change over time of the communication channel, at least one of the equations including a deterministic model matrix may be used in determining a next state of the communication channel from a previous state based only on deterministic processes, and the method may be further characterized by obtaining at least either the offset or the fading rate from the deterministic model matrix. Further, the autoregressive model may be a first-order frequency-flat autoregressive channel model having a single-component deterministic model matrix, and the fading rate and offset are given respectively by:

$$\hat{f_d}T = \frac{1}{2\pi}\arccos\left(\frac{4|\hat{a}| - 1 - |\hat{a}|^2}{2|\hat{a}|}\right)$$

$$\hat{\Omega} = \frac{1}{2\pi}\arg(\hat{a}),$$

in which $\hat{a}$ is the value of the single component of the deterministic model matrix. Also further, the autoregressive model may be a lightly damped second-order autoregressive channel model having a two-component deterministic model matrix, and the fading rate and offset may be given respectively by:

$$\hat{f_d}T = \frac{1}{2\pi}\arccos\left(\frac{\hat{a}_1}{2\sqrt{(\hat{a}_2)}}\right)$$

$$\hat{\Omega} = \frac{1}{2\pi}(\arg(p2) + (\arg(p1) + \arg(p2))/2)$$

in which:

$$p1 = \frac{-\hat{a}_1 + \sqrt{\hat{a}_1^2 - 4\hat{a}_2}}{2}, \text{ and}$$

$$p2 = \frac{-\hat{a}_1 + \sqrt{\hat{a}_1^2 - 4\hat{a}_2}}{2},$$

and $\hat{a}_1$ and $\hat{a}_2$ are respectively the values of the first and second components of the deterministic model matrix.

Also in accord with the first aspect of the invention, the autoregressive parameters may be determined using an iterative expectation-maximization method.

Also in accord with the first aspect of the invention, the autoregressive parameters are determined using a recursive gradient based method.

A second aspect of the invention provides a receiver of a wireless communication system comprising means for providing information for use in adapting to changing characteristics of a communication channel over which the receiver receives a signal at a carrier frequency, the receiver having a local oscillator oscillating at a local frequency initially tuned to a frequency suitable for receiving the carrier frequency, the receiver characterized by: means, responsive to received signal samples extracted from the received signal and corresponding to transmitted symbols, for providing estimates of autoregressive parameters representing the changing communication channel based on a predetermined parametric model of how as a result of stochastic processes the communication channel changes over time; and means, responsive to the estimated values of the autoregressive parameters, for providing an estimate of the channel impulse response and an estimate of a frequency offset of at least one multipath signal.

A third aspect of the invention provides a telecommunication system, including a base transceiver station and a user equipment, both of which include a receiver, characterized in that both receivers are according to the second aspect of the invention, and so provide information of use in adjusting to changing parameters of the communication channel.

A fourth aspect of the invention provides a telecommunication system, including a base transceiver station and a user equipment, both of which include a receiver, characterized in that both receivers are according to the second aspect of the invention and so provide information of use in adjusting to changing parameters of the communication channel, and further comprising means for providing an estimate of fading rate, and wherein both the base transceiver station and the user equipment also include a transmitter responsive to the information of use in adjusting to changing parameters of the communication channel.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
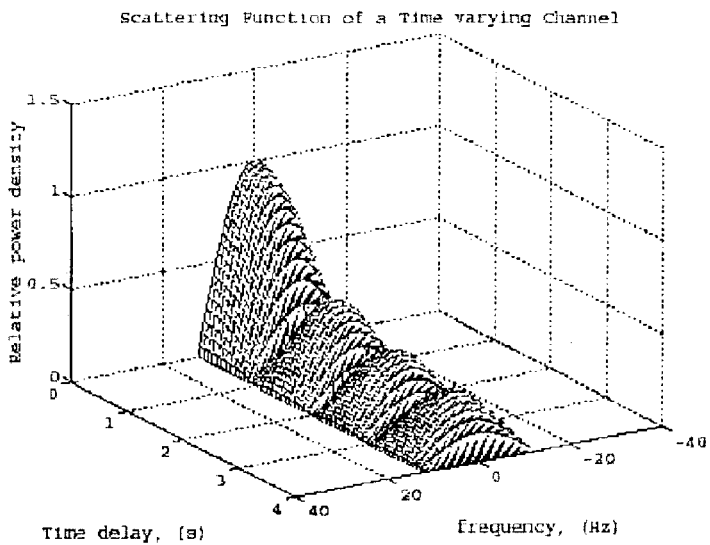
FIG. 1 is a three-dimensional graph of a scattering function.
Figure 2:
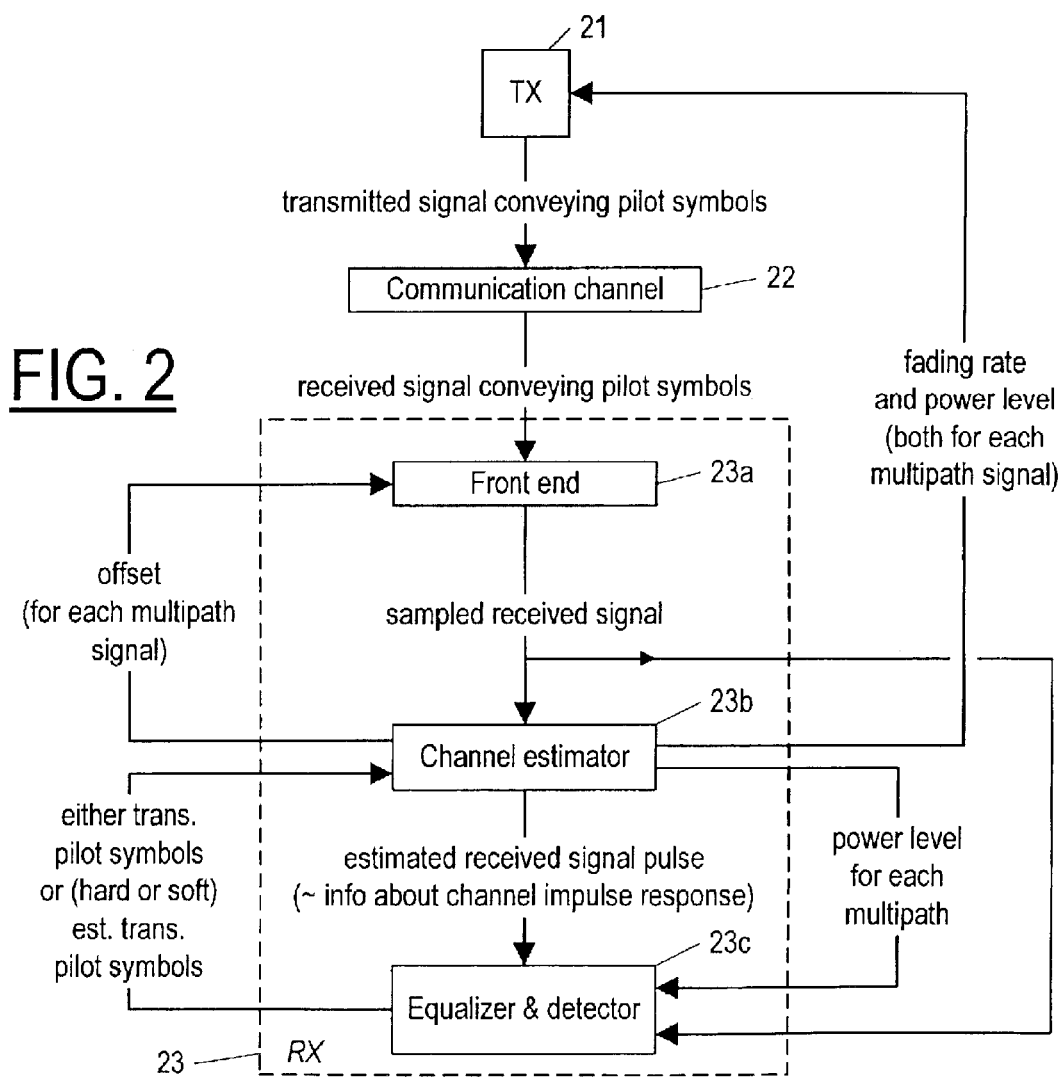
FIG. 2 is a block diagram/flow diagram of a system including a transmitter and receiver, in which the receiver includes an apparatus for determining fading rate and offset, according to the invention.

Referring now to FIG. 2, according to the invention, a receiver (RX) 23 receives a signal conveying pilot symbols transmitted by a transmitter 21 over a communication channel 22, assumed to be a fading dispersive communication channel, and then, using a predetermined parametric model that is preferably an autoregressive model, the receiver 23 estimates, for each of possibly several resolvable multipath signals, a fading rate, an offset, and a power level, as described below. The receiver 23 includes a front end 23a, a channel estimator 23b, and a module 23c that preferably includes an equalizer and a detector, but at least includes a detector. The front end 23a provides to the channel estimator 23b and to the module 23c samples of the received signal. The detector component of the equalizer and detector module(s) 23c provides to the channel estimator 23b either the a priori known pilot symbols (training symbols) or (hard or soft) estimated transmitted pilot symbols. Using the pilot symbols and the received signal, the channel estimator uses a method according to the invention, as described below, to provide to the front end 23a an offset (Doppler shift) for each resolvable multipath component (assumed here to be several in number), to provide to the equalizer and detector module(s) 23c power levels for each multipath and information on the channel impulse response (or, equivalently, estimated pulses corresponding to each transmitted pilot symbol), and to provide to the transmitter 21 (via a feedback channel) a fading rate and power level for each multipath, which the transmitter 21 can use to adjust the parameters for functions like channel coding, interleaving and modulation so as to better "match" the prevailing channel conditions.

The Doppler shifts/offsets for different multipaths are often close to each other, and especially in such cases an estimate for (overall) frequency offset between transmitter and receiver frequency references can be obtained as an average of the Doppler shifts for the different multipaths. Such an estimate for the frequency offset can be used at the receiver front end 23a to adjust the receiver oscillator so as to compensate for the offset. As mentioned above, an offset as used here is the total difference between the carrier frequency of the transmitted signal or a related frequency on the one hand, and on the other hand, a local frequency at which a (local) oscillator in the receiver oscillates—an oscillator originally tuned to (either) the carrier frequency (or an appropriate related frequency), i.e. initially tuned to a frequency suitable for receiving the carrier frequency.

Figure 7:
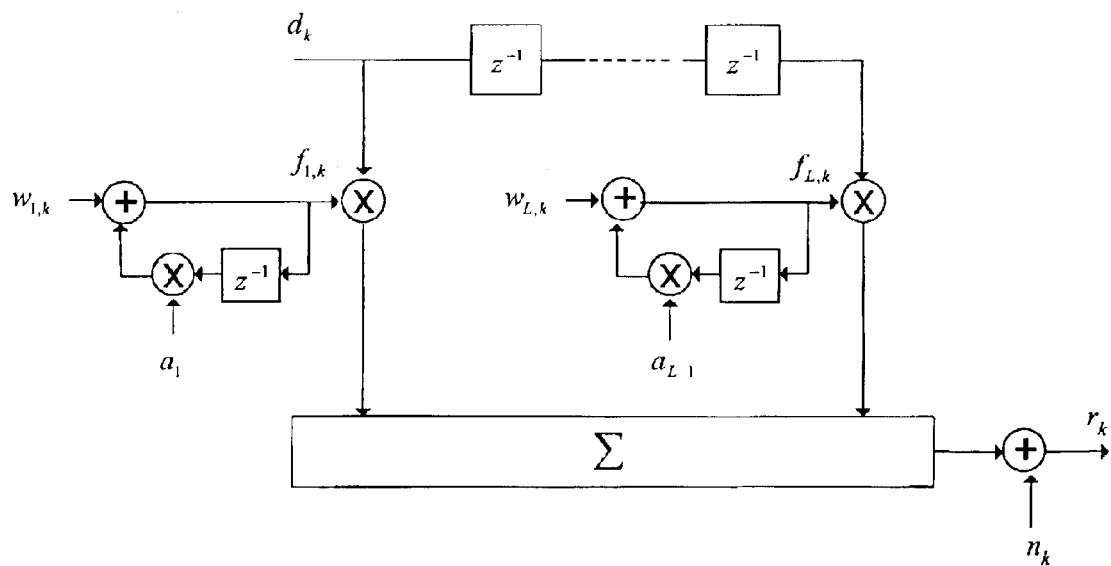
FIG. 7 is a block diagram/flow diagram illustrating another discrete-time channel model of a type in which the present invention can be used, and in particular, one in which the channel coefficients for each channel tap are due to the first-order autoregressive complex bandpass random process.
Figure 6:
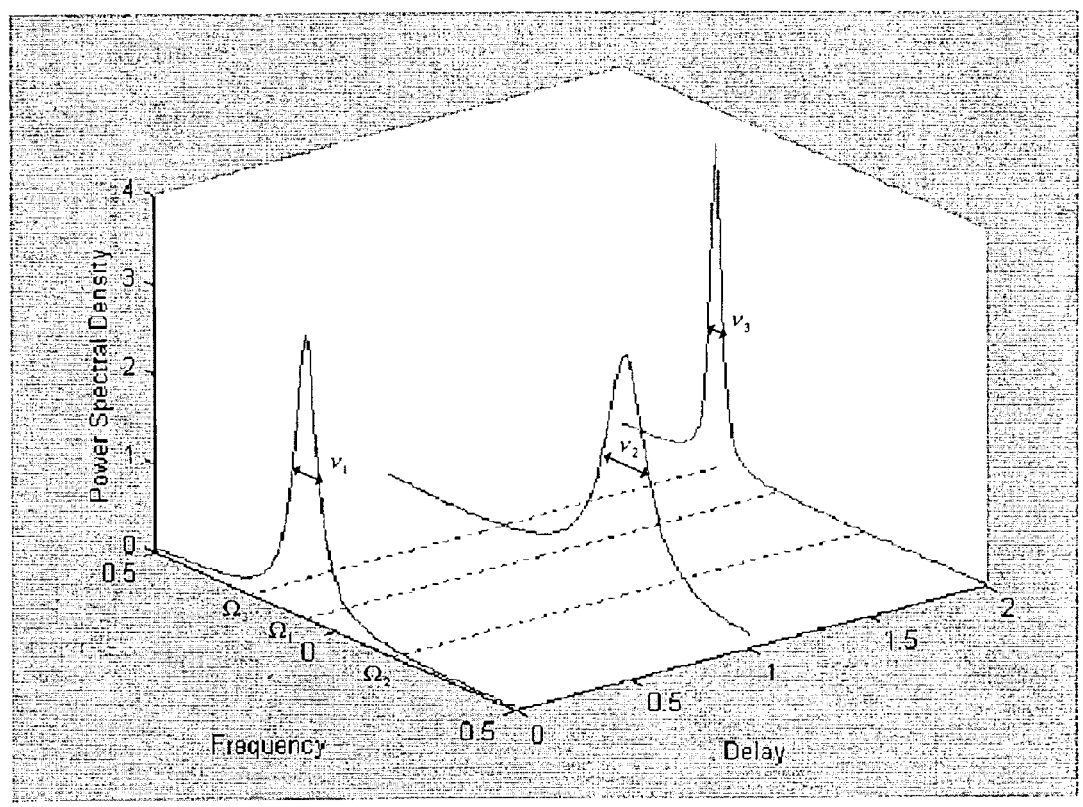
FIG. 6 is a three-dimensional graph of a scattering function for the discrete-time tapped delay channel model of FIG. 5 (or FIG. 7).

A channel estimator 23b according to the invention can provide fading rates, offsets, and so on using estimates of first-order AR (channel) parameters, in which case the fading rate (for a given multipath) and the corresponding offset are, respectively;

$$\hat{v} = \hat{f}_d T = \frac{1}{2\pi} \arccos\left(\frac{4|\hat{a}| - 1 - |\hat{a}|^2}{2|\hat{a}|}\right) \text{ and} \quad (1)$$

$$\hat{\Omega} = \frac{1}{2\pi} \arg(\hat{a}) \quad (2)$$

in which â is the estimated value of the diagonal component pertaining to the given multipath (â is the one and only component of matrix A if there exists only one resolvable multipath component in the channel, i.e., channel is frequency-flat) (in case of a first-order calculation) of a so-called deterministic model matrix A, which contains information about how the communication channel changes in time. More specifically, assuming a $p^{th}$ order autoregressive AR(p) channel model, the communication channel corresponding to the discrete-time model presented in FIG. 7 can be described using the state-space model:

$$f_k = A f_{k-1} + \Sigma w_k$$

$$r_k = d(k) f_k + n_k$$

in which: $r_k = r(k)$ is the received signal sample, $f_k$ is a so-called vector channel process (channel impulse response) defined by:

$$f(k) = f_k = [f(k)^T, f(k-1)^T, \ldots, f(k-p+1)^T]^T$$

with $f(k) = [f_{1,k}, \ldots, f_{LJ,k}]^T$; (L is the length of the channel memory and J is the oversampling factor) and $d(k) = [d(k), 0_{1 \times (p-1)LJ}]$ is a modified data (pilot) symbol vector with $d(k) = [d_k, \ldots, d_{k-LJ+1}]$ and with $0_{1 \times (p-1)LJ}$ indicating a zero row vector; and $w_k = [w_{1,k}, \ldots, w_{LJ,k}]^T$ is a Gaussian noise vector independent of the receiver noise $n_k$ and having an autocorrelation matrix $R_w(k) = I_{LJ} \delta(k)$ where $I_{LJ}$ is an LJ×LJ identity matrix; and A is the pLJ×pLJ deterministic model matrix:

$$A = \begin{bmatrix} A_1 & A_2 & \cdots & A_p \\ I_{LJ} & 0_{LJ} & \cdots & 0_{LJ} \\ & \ddots & & 0_{LJ} \\ 0_{LJ} & & I_{LJ} & 0_{LJ} \end{bmatrix}$$

and Σ is the pLJ×LJ model matrix:

$$\Sigma = \begin{bmatrix} \Sigma_1 \\ 0_{LJ} \\ \vdots \\ 0_{LJ} \end{bmatrix}$$

where $A_1, \ldots, A_p$ are LJ×LJ submatrices (with off-diagonal elements describing the correlation between channel taps), $\Sigma_1$ is a LJ×LJ diagonal matrix with $\mathrm{diag}(\Sigma_1) = \{\sigma_1, \ldots, \sigma_{Lj}\}$, and $O_{LJ}$ is a LJ×LJ zero matrix.

A second-order calculation can also be performed. For a lightly damped second-order AR model, we can write the AR coefficients (for a given multipath in the presence of the frequency offset Ω) as:

$$a_1 = -2\alpha \cos(2\pi f_d T) \exp(j2\pi\Omega) \text{ and } a_2 = a^2 \exp(j4\pi\Omega) \quad (3)$$

where α is a pole radius reflecting the damping of the coefficient variation (or the ripple in the passband of the frequency response). Based on such a model, we can obtain the following estimates for the fading rate for a given multipath and the corresponding offset, respectively:

$$\hat{v} = \hat{f}_d T = \frac{1}{2\pi} \arccos\left(\frac{\hat{a}_1}{2\sqrt{(\hat{a}_2)}}\right) \text{ and} \quad (4)$$

$$\hat{\Omega} = \frac{1}{2\pi}(\arg(p2) + (\arg(p1) + \arg(p2))/2) \quad (5)$$

in which:

$$p1 = \frac{-\hat{a}_1 + \sqrt{\hat{a}_1^2 - 4\hat{a}_2}}{2}, \text{ and} \quad (6)$$

$$p2 = \frac{-\hat{a}_1 - \sqrt{\hat{a}_1^2 - 4\hat{a}_2}}{2},$$

and $\hat{a}_1$ and $\hat{a}_2$ are respectively the estimated values of the first and second components of the deterministic model matrix A, which for a second-order calculation has only two components when assuming that the channel is frequency flat.

For a frequency-selective (multipath) channel, the submatrices $A_i$ of the deterministic model matrix A are diagonal in uncorrelated scattering channels. In the presence of the Doppler frequencies, the submatrices $A_i$ define the spectrum of the complex bandpass process and, in particular, the $m^{th}$ diagonal element of $A_i$ is given as $$A_i(m,m) = A'_i(m,m) \exp(j2\pi(i \times \Omega_m)),$$

where $A'_i(m,m)$ is an equivalent matrix element for the lowpass fading process. Now the fading rate of the $m^{th}$ multipath component using an AR-1 model (i.e. using first order autoregressive estimates) for each multipath is obtained as:

$$v_m = \frac{1}{2\pi} \arccos\left( \frac{4|\hat{A}_1(m,m)| - 1 - |\hat{A}_1(m,m)|^2}{2|\hat{A}_1(m,m)|} \right), \quad (7)$$

and the Doppler shift (frequency offset) of the $m^{th}$ multipath is obtained as $$\hat{\Omega}_m = \frac{1}{2\pi} \arg(\hat{A}_1(m,m)). \quad (8)$$

The fading rate and Doppler shift of the $m^{th}$ multipath component when using an AR-2 model are given by:

$$v_m = \frac{1}{2\pi} \arccos\left( \frac{\hat{A}_1(m,m)}{2\sqrt{\hat{A}_2(m,m)}} \right), \text{ and} \quad (9)$$

$$\hat{\Omega}_m = \frac{1}{2\pi} \left( \arg(p2) + \frac{\arg(p1) + \arg(p2)}{2} \right), \quad (10)$$

respectively. The values for p1 and p2 are obtained from eq. (6) by setting $\hat{a}_1 = \hat{A}_1(m,m)$ and $\hat{a}_2 = \hat{A}_2(m,m)$.

Figure 3:
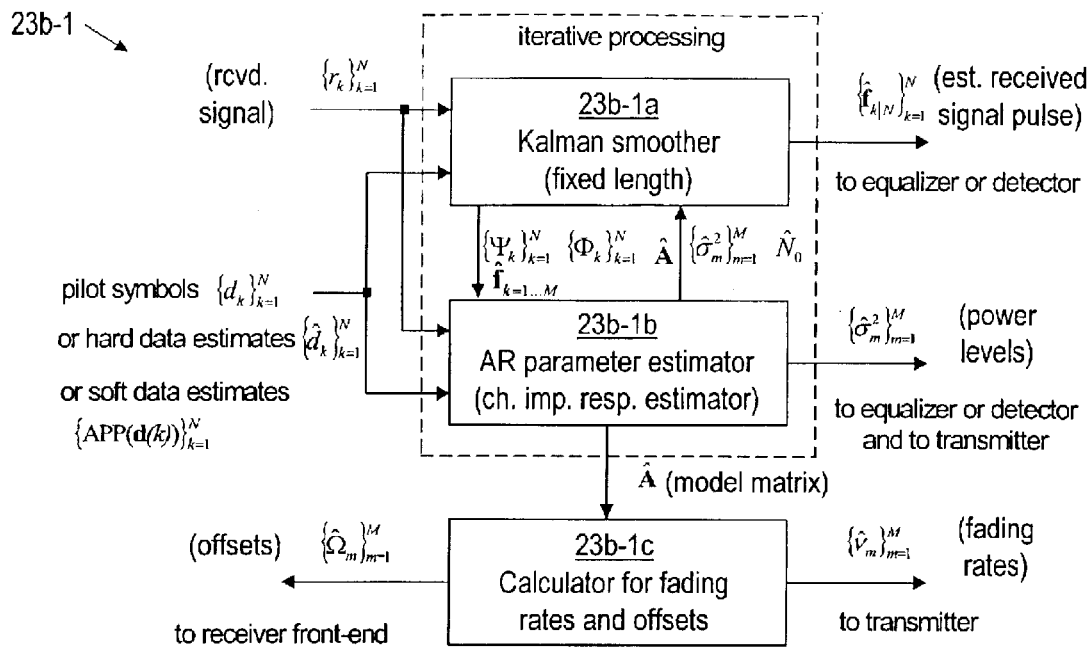
FIG. 3 is a block diagram/flow diagram illustrating an embodiment of the apparatus in FIG. 2 for determining fading rate and offset, an embodiment that uses iterative processing.

Referring now to FIG. 3, the channel estimator 23b is shown in a first embodiment 23b-1 in which iterative processing is used. The iterative channel estimator 23b-1 includes a block-processing Kalman smoother module 23b-1a that first of all extracts from the received signal sequence $r = \{r_k\}_{k=1}^{N}$ (the index k corresponding to an instant of time and N corresponding to the block size) estimated received signal pulses (or, equivalently, estimates of the channel impulse response) $\hat{f}_k$ using pilot symbols, which it provides to the equalizer and detector module(s) 23c; to do so, the Kaltan filter uses information about the communication channel provided by a next module included in the iterative channel estimator, namely an AR parameter estimator 23b-1b that is a block-processing module and calculates AR (autoregressive) parameters characterizing the communication channel, the AR parameters including the components of an estimated deterministic model matrix Â, estimated power levels $\hat{\sigma}_m^2$ for each multipath (each particular multipath component being indicated by the subscript m, which ranges from 1 to M in this particular setting), and an estimate $\hat{N}_0$ of the channel noise level. In providing the deterministic model matrix, power levels, and noise level, the block-processing AR parameter estimator 23b-1b uses as inputs special matrices $\Phi_k$ and $\Psi_k$ (given below), each defined in terms of smoothed estimates of the channel impulse response $\hat{f}_k$ and corresponding error covariances $P_k$. The block-processing AR parameter estimator 23b-1b provides the deterministic model matrix, power levels and noise level to the block-processing Kalman smoother 23b-1a (for the next iteration), and after last iteration provides the power levels to the equalizer and detector module(s) 23c, and provides the deterministic model matrix to a further component of the channel estimator, namely a fading rate and offset calculator 23b-1c, which uses the deterministic model matrix to calculate a fading rate and offset for each multipath, as described below, providing the fading rates to the transmitter 21 (FIG. 2) via a feedback channel, and the offsets to the receiver front end 23a.

The block-processing Kalman smoother 23b-1a and the block-processing AR parameter estimator 23b-1b are operated iteratively until convergence (estimated values stop changing appreciably) or until a predetermined number of iterations are completed. Initially (at first iteration) the block-processing Kalman smoother 23b-1a is operated in a state-space model in which the AR parameters are set to predetermined initial values.

The channel estimator 23b-1 is iterative in the sense that the Kalman smoother 23b-1a and the interconnected AR parameter estimator 23b-1b are operated alternately (in turn), feeding each other at each iteration. The Kalman smoother and the AR parameter estimator themselves are not iterative but are instead block-processing devices, i.e. each is a device that accepts as an input a sequence of parameters (e.g., a sequence of received signal samples), and then processes the entire input sequence in some deterministic non-iterative way so as to obtain the desired output (either a single parameter or a sequence of parameters). In tact, the iterative interconnection of the Kalman smoother 23b-1a and the AR parameter estimator 23b-1b is a specific instance of an iterative expectation-maximization (EM) algorithm having an expectation step (E-step) and a maximization step (M-step), where the Kalman smoother 23b-1a realizes the E-step and the AR parameter estimator 23b-1b realizes the M-step. After the last iteration, when the internal computation inside the iterative processing module (dashed rectangle of FIG. 3) is ready, the output signals of the iterative processing module are ready for further processing (e.g., the model matrix is provided to the fading rate and offset calculator 23b-1c).

The estimates for the deterministic model matrix A, for power levels of the multipath signals $\sigma_m^2$, and for receiver noise power level $N_0$ are obtained via an (iterative) pilot-symbol aided maximum likelihood calculation for the AR parameters via an expectation maximization algorithm, and in particular by using as the M-step of the algorithm:

$$\hat{A}^{(i)} = \sum_{k=1}^{N} \Psi_k^{(i)} \left( \sum_{k=1}^{N} \Phi_{k-1}^{(i)} \right)^{-1} \quad (11)$$

-continued $$\hat{\sigma}_m^{2(i)} = \frac{1}{2N} \sum_{k=1}^{N} \left([\Phi_k^{(i)}]_{mm} - \hat{a}_m^{(i)} \psi_{k,m}^{(i)}{}^H\right) m = 1, \ldots, LJ \quad (12)$$

$$\hat{N}_0^{(i)} = \frac{T_s}{2N} \sum_{k=1}^{N} \left(|r(k)|^2 - 2\text{Re}\{r*(k)d(k)f_{k|N}^{(i)}\} + d(k)\Phi_k^{(i)} d^H(k)\right) \quad (13)$$

in which the special matrices $\Phi_k$ and $\Psi_k$ are defined in terms of the smoothed estimates of the channel impulse response and corresponding error covariances, as follows:

$$E[f_k f_k^H | r_1 \hat{\Theta}^{(i-1)}] = \hat{f}_{k|N}^{(i)} \hat{f}_{k|N}^{(i)H} + P_{k|N}^{(i)} \triangleq \Phi_k^{(i)} \quad (14)$$

$$E[f_k f_{k-1}^H | r_1 \hat{\Theta}^{(i-1)}] = \hat{f}_{k|N}^{(i)} \hat{f}_{k-1|N}^{(i)H} + P_{k,k-1|N}^{(i)} \triangleq \Psi_k^{(i)} \quad (15)$$

using $$E[f_k | r_1 \hat{\Theta}^{(i-1)}] = \hat{f}_{k|N}^{(i)} \quad (16)$$

(where E[. . .] indicates computing a mathematical expectation) in which $\Theta=[\theta_1, \theta_2]^T$ where $\theta_1=[N_0]$ (parameters of the measurement equation of the Kalman smoother) and $\theta_2=[\sigma_1^2, \ldots, \sigma_{LJ}^2, a_1, \ldots a_{LJ}]$ (parameters of the state equation of the Kalman smoother) where the $a_i$ are columns of the deterministic model matrix A, where $\psi_{k,m}^{(\tau)}$ is the mth row of the matrix $\Psi_k^{(\tau)}$, and where $\hat{f}_{\lambda|N}^{(\tau)}$ is the smoothed channel estimate (i.e. the smoothed estimate of the channel impulse response), and $P_{k|N}^{(\tau)}$ and $P_{k,\lambda-1|N}$ are the error covariance matrices. The above equation for $\hat{A}^{(\tau)}$ gives the Yule-Walker solution for the AR parameters where the true autocorrelation matrix of the fading channel is replaced by its current estimate. The smoothed estimates of the channel impulse response and related error covariances are calculated using standard Kalman smoothing equations. [See R. H. Shumway and D. S. Stoffer, "An approach to time series smoothing and forecasting using the EM algorithm," *J. Time Series Anal.*, vol. 3, no. 4, pp. 253–264, 1982 for details of the Kalman smoothing equations.]

Figure 4:
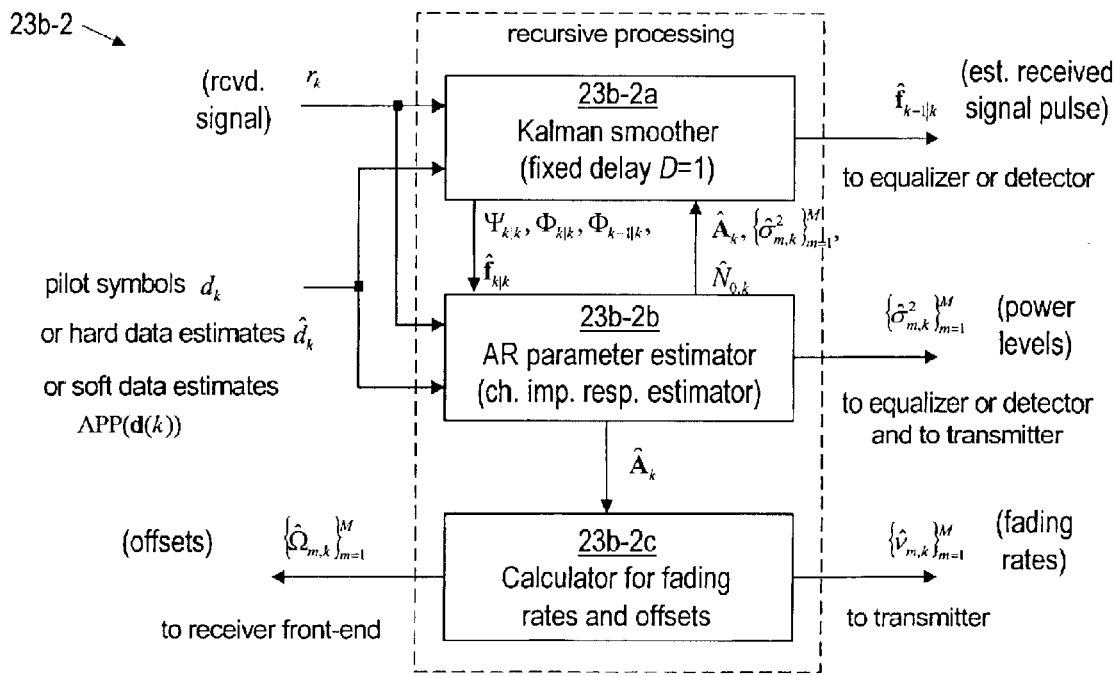
FIG. 4 is a block diagram/flow diagram illustrating an embodiment of the apparatus in FIG. 2 for determining fading rate and offset, an embodiment that uses recursive processing.
Figure 5:
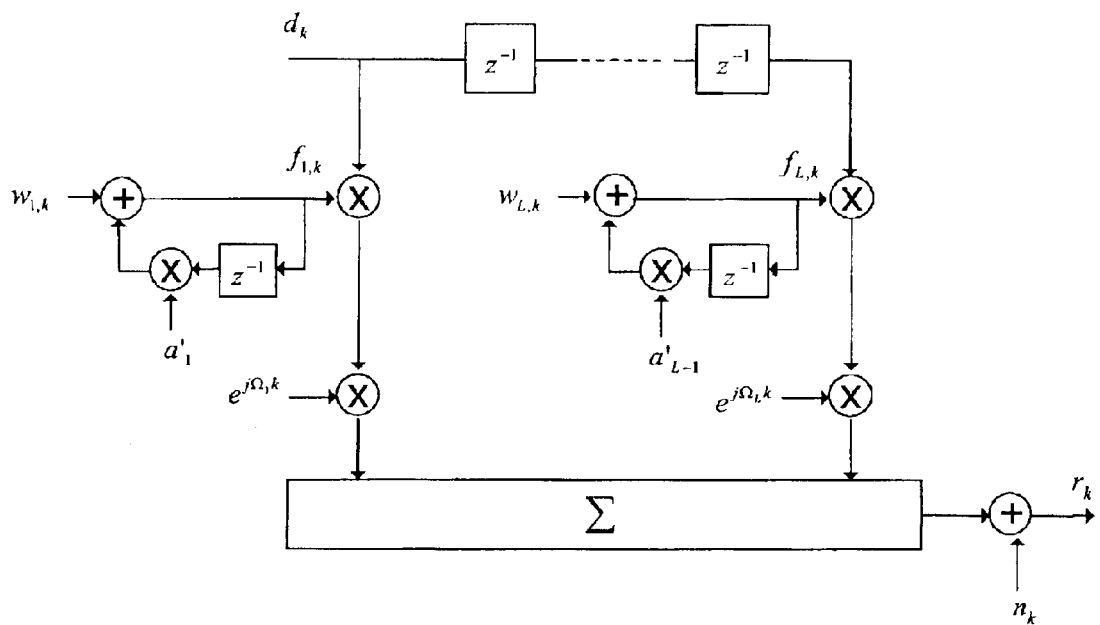
FIG. 5 is a block diagram/flow diagram illustrating a model of a multipath fading channel, a model in terms of a discrete-time tapped delay line. The channel coefficients for each channel tap are due to the first-order autoregressive lowpass random process.

Referring now to FIG. 4, the channel estimator 23b is shown in a second embodiment 23b-2 in which recursive processing is used. The recursive processing channel estimator 23b-2 includes a recursive fixed-delay Kalman smoother module 23b-2a, a recursive module 23b-2b for calculating AR parameters, and a recursive module 23b-2c for calculating fading rates and offsets, and so includes modules that correspond to each of the modules of the iterative channel estimator 23b-1; the modules of the recursive channel estimator 23b-2 have substantially the same inputs and outputs as do the corresponding modules of the iterative channel estimator 23b-1, but the recursive channel estimator produces new estimates for all parameters in response to each new received signal sample and pilot symbol or estimated symbol value. At the start of recursions (at the beginning of the received signal sequence) the AR-model parameters are set at predetermined initial values. (The recursive channel estimator as defined here implies a fully recursive processing in the sense that each new received signal sample will trigger a sequential updating of all parameters; starting from the parameters of the fixed-delay Kalman smoother and going down to the parameters of the fading rate and offset calculator.)

The parameter update steps for the parameters of the AR model are calculated by the recursive channel estimator 23b-2 using the following equations:

$$\hat{A}_k = \hat{A}_{k-1} + \Lambda_{A,k}(\Psi_{k|k} - \hat{A}_{k-1}\Phi_{k-1|k}), \quad (17)$$

$$\hat{\sigma}_{m,k}^2 = \quad (18)$$
$$(1 - \lambda_{\sigma^2})\hat{\sigma}_{m,k-1}^2 + \lambda_{\sigma^2}\left([\Phi_{k|k}]_{mm} - 2\text{Re}\{\psi_{k|k,m}\hat{A}_k\} + \hat{A}_k \Phi_{k-1|k} \hat{A}_k^H\right)$$
$$m = 1, \ldots, L, \text{ and}$$

$$\hat{N}_{0,k} = (1 - \lambda_{N_0})\hat{N}_{0,k-1} + \lambda_{N_0}\left(|\tau_k|^2 - 2\text{Re}\{\tau_k \hat{f}_{k|k}^H d_k^H\} + d_k \Phi_{k|k} d_k^H\right), \quad (19)$$

where $$\Lambda_{A,k} = \text{diag}\left([\lambda_A/\hat{\sigma}_{1,k-1}^2 \ldots \lambda_A/\hat{\sigma}_{L,k-1}^2]\right)$$

in which $\lambda_A$, $\lambda_{\sigma^2}$ and $\lambda_{N_0}$ are predetermined step sizes.

It is important to understand that the AR modeling and related estimators of the invention provide more information about a fading channel than merely estimates of frequency offset and fading rate. We actually obtain also the form of the fading spectrum or the scattering function of the discrete-time frequency-selective channel. Furthermore, we can also obtain accurate estimates of the relative powers of different multipaths of the multipath fading channels. In addition to other purposes, the estimated power profile can possibly also be used for changing the complexity of a receiver complexity (e.g. for changing the size of the equalizer trellis) and thus for reducing power consumption of the terminal, depending on actual channel conditions. Importantly, the estimated AR coefficients as such can also be effectively used for the purpose of channel impulse response estimation.

Also, it is important to understand that the invention applies not only to cases where the frequency of a local oscillator initially tuned to the carrier frequency differs from time to time from the carrier frequency by an offset because of changes in characteristics of the communication channel, but also to cases where the offset is due to the drift in the carrier frequency or drift in the frequency at which the local oscillator vibrates.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by a receiver (23) of a wireless communication system in providing information for use in adapting to changing characteristics of a communication channel (22) over which the receiver (23) receives a signal at a carrier frequency, the receiver (23) having a local oscillator oscillating at a local frequency initially tuned to a frequency suitable for receiving the carrier frequency, the method characterized by:

a step (23b-1b 23b-2b), responsive to received signal samples extracted from the received signal and corresponding to transmitted symbols, of providing estimates of autoregressive parameters representing the changing communication channel (22) based on a predetermined parametric model of how as a result of stochastic processes the communication channel (22) changes over time; and a step (23b-1c 23b-2c), responsive to the estimated values of the autoregressive parameters, of providing an estimate of the channel impulse response and an estimate of a frequency offset of at least one multipath signal.

2. The method of claim 1, wherein the estimates of autoregressive parameters are expectation maximization estimates.

3. The method of claim 1, wherein in the step (23b-1c 23b-2c) of providing an estimate of the channel impulse response and an estimate of a frequency offset of at least one multipath signal, an estimate of power spectral density is also provided.

4. The method of claim 1, wherein in the step (23b-1c 23b-2c) of providing an estimate of the channel impulse response and an estimate of a frequency offset of at least one multipath signal, an estimate of fading rate is also provided.

5. The method of claim 1, wherein in the step (23b-1c 23b-2c) of providing an estimate of the channel impulse response and an estimate of a frequency offset of at least one multipath signal, the receiver (23) uses the estimate of the channel impulse response to provide a value for at least either the offset or a fading rate for at least one multipath signal.

6. The method of claim 1, wherein the predetermined parametric model is an autoregressive model providing linear equations describing the change over time of the communication channel (22), wherein at least one of the equations including a deterministic model matrix is used in determining a next state of the communication channel from a previous state based only on deterministic processes, and wherein the method is further characterized by obtaining at least either the offset or a fading rate from the deterministic model matrix.

7. The method of claim 6, wherein the autoregressive model is a first-order frequency-flat autoregressive channel model having a single-component deterministic model matrix, and the fading rate and offset are given respectively by:

$$\hat{f_d}T = \frac{1}{2\pi}\arccos\left(\frac{4|\hat{a}| - 1 - |\hat{a}|^2}{2|\hat{a}|}\right)$$

$$\hat{\Omega} = \frac{1}{2\pi}\arg(\hat{a}),$$

in which $\hat{a}$ is the value of the single component of the deterministic model matrix.

8. The method of claim 6, wherein the autoregressive model is a lightly damped second-order autoregressive channel model having a two-component deterministic model matrix, and the fading rate and offset are given respectively by:

$$\hat{f_d}T = \frac{1}{2\pi}\arccos\left(\frac{\hat{a}_1}{2\sqrt{(\hat{a}_2)}}\right)$$

$$\hat{\Omega} = \frac{1}{2\pi}(\arg(p2) + (\arg(p1) + \arg(p2))/2)$$

in which:

$$p1 = \frac{-\hat{a}_1 + \sqrt{\hat{a}_1^2 - 4\hat{a}_2}}{2}, \quad \text{and}$$

$$p2 = \frac{-\hat{a}_1 + \sqrt{\hat{a}_1^2 - 4\hat{a}_2}}{2},$$

and $\hat{a}_1$ and $\hat{a}_2$ are respectively the values of the first and second components of the deterministic model matrix.

9. The method of claim 1, wherein the autoregressive parameters are determined using an iterative expectation-maximization method.

10. The method of claim 1, wherein the autoregressive parameters are determined using a recursive gradient based method.

11. A receiver (23) of a wireless communication system comprising means for providing information for use in adapting to changing characteristics of a communication channel (22) over which the receiver (23) receives a signal at a carrier frequency, the receiver (23) having a local oscillator oscillating at a local frequency initially tuned to a frequency suitable for receiving the carrier frequency, the receiver (23) characterized by:

means (23b-1b 23b-2b), responsive to received signal samples extracted from the received signal and corresponding to transmitted symbols, for providing estimates of autoregressive parameters representing the changing communication channel (22) based on a predetermined parametric model of how as a result of stochastic processes the communication channel (22) changes over time; and means (23b-1c 23b-2c), responsive to the estimated values of the autoregressive parameters, for providing an estimate of the channel impulse response and an estimate of a frequency offset of at least one multipath signal.

12. A telecommunication system, including a base transceiver station and a user equipment, both of which include a receiver (23), characterized in that both receivers (23) are as recited in claim 11 and so provide information of use in adjusting to changing parameters of the communication channel (22).

13. A telecommunication system, including a base transceiver station and a user equipment, both of which include a receiver (23), characterized in that both receivers (23) are as recited in claim 11 and so provide information of use in adjusting to changing parameters of the communication channel (22), and further comprising means (23b-1c 23b-2c) for providing an estimate of fading rate, and wherein both the base transceiver station and the user equipment also include a transmitter (21) responsive to the information of use in adjusting to changing parameters of the communication channel (22).

* * * * *

UNITED STATES PATENT AND TRADEMARK OFFICE
CERTIFICATE OF CORRECTION

PATENT NO. : 6,868,276 B2
DATED : March 15, 2005
INVENTOR(S) : Mauri Nissila

It is certified that error appears in the above-identified patent and that said Letters Patent is hereby corrected as shown below:

Column 14,
Line 1, please delete the equation "$p2 = \dfrac{-\hat{a}_1 + \sqrt{\hat{a}_1^2 - 4\hat{a}_2}}{2}$," and substitute -- $p2 = \dfrac{-\hat{a}_1 - \sqrt{\hat{a}_1^2 - 4\hat{a}_2}}{2}$, -- therefor.

Signed and Sealed this

Twelfth Day of July, 2005

JON W. DUDAS
*Director of the United States Patent and Trademark Office*